(12) United States Patent
Bertrand et al.

(10) Patent No.: US 12,036,919 B2
(45) Date of Patent: Jul. 16, 2024

(54) VEHICLE STEERING WHEEL LIGHTING DEVICE HAVING A LIGHT GUIDE SUPPORTING THE DIFFUSER

(71) Applicant: AUTOLIV DEVELOPMENT AB, Vargarda (SE)

(72) Inventors: Olivier Bertrand, Courcome (FR); Hugues Doursoux, Latillé (FR)

(73) Assignee: Autoliv Development AB, Vårgårda (SE)

(*) Notice: Subject to any disclaimer, the term of this patent is extended or adjusted under 35 U.S.C. 154(b) by 0 days.

(21) Appl. No.: 18/261,624

(22) PCT Filed: Jan. 18, 2022

(86) PCT No.: PCT/EP2022/050944
§ 371 (c)(1),
(2) Date: Jul. 14, 2023

(87) PCT Pub. No.: WO2022/157129
PCT Pub. Date: Jul. 28, 2022

(65) Prior Publication Data
US 2024/0067083 A1   Feb. 29, 2024

(30) Foreign Application Priority Data
Jan. 20, 2021   (FR) ..................... 2100538

(51) Int. Cl.
*B60Q 3/283*   (2017.01)
*B60Q 3/64*   (2017.01)
*B62D 1/06*   (2006.01)

(52) U.S. Cl.
CPC ............. *B60Q 3/283* (2017.02); *B60Q 3/64* (2017.02); *B62D 1/06* (2013.01)

(58) Field of Classification Search
CPC ............. B60Q 3/283; B60Q 3/64; B62D 1/06
USPC ............................................. 362/488
See application file for complete search history.

(56) References Cited

U.S. PATENT DOCUMENTS

| 11,312,294 | B1* | 4/2022 | Matsu | B60K 37/06 |
| 2014/0328077 | A1* | 11/2014 | Tovar | B62D 1/046 362/511 |
| 2016/0025281 | A1 | 1/2016 | Gardner et al. | |
| 2019/0016383 | A1* | 1/2019 | Spencer | B60Q 3/283 |
| 2021/0221285 | A1* | 7/2021 | Kihara | B62D 1/06 |

(Continued)

FOREIGN PATENT DOCUMENTS

| FR | 3028476 A1 | 5/2016 |
| FR | 3070663 A1 | 3/2019 |

(Continued)

*Primary Examiner* — Laura K Tso
(74) *Attorney, Agent, or Firm* — Matthew D. Thayne; Thayne and Davis LLC

(57) ABSTRACT

A lighting device for a vehicle steering wheel rim, comprising a holding body comprising at least one internal wall with at least one opening, at least one light source arranged to emit light, a diffuser arranged to diffuse the light coming from the at least one light source towards the vehicle occupant, a light guide arranged to guide the light emitted from the at least one light source towards the diffuser, wherein the light guide comprises a light collecting face arranged on a first side of the opening, a light emitting face arranged on a second side of the opening, and the light guide is also engaged with the diffuser to shape it with a predetermined size.

14 Claims, 4 Drawing Sheets

(56) References Cited

U.S. PATENT DOCUMENTS

| | | |
|---|---|---|
| 2021/0354743 A1 | 11/2021 | Bertrand et al. |
| 2022/0258787 A1 | 8/2022 | Gardner et al. |
| 2022/0306198 A1* | 9/2022 | Sakakibara ............ B60Q 3/283 |

FOREIGN PATENT DOCUMENTS

| | | |
|---|---|---|
| FR | 3096940 A1 | 12/2020 |
| JP | 2010241275 A | 10/2010 |
| WO | 2019/048538 A1 | 3/2019 |

* cited by examiner

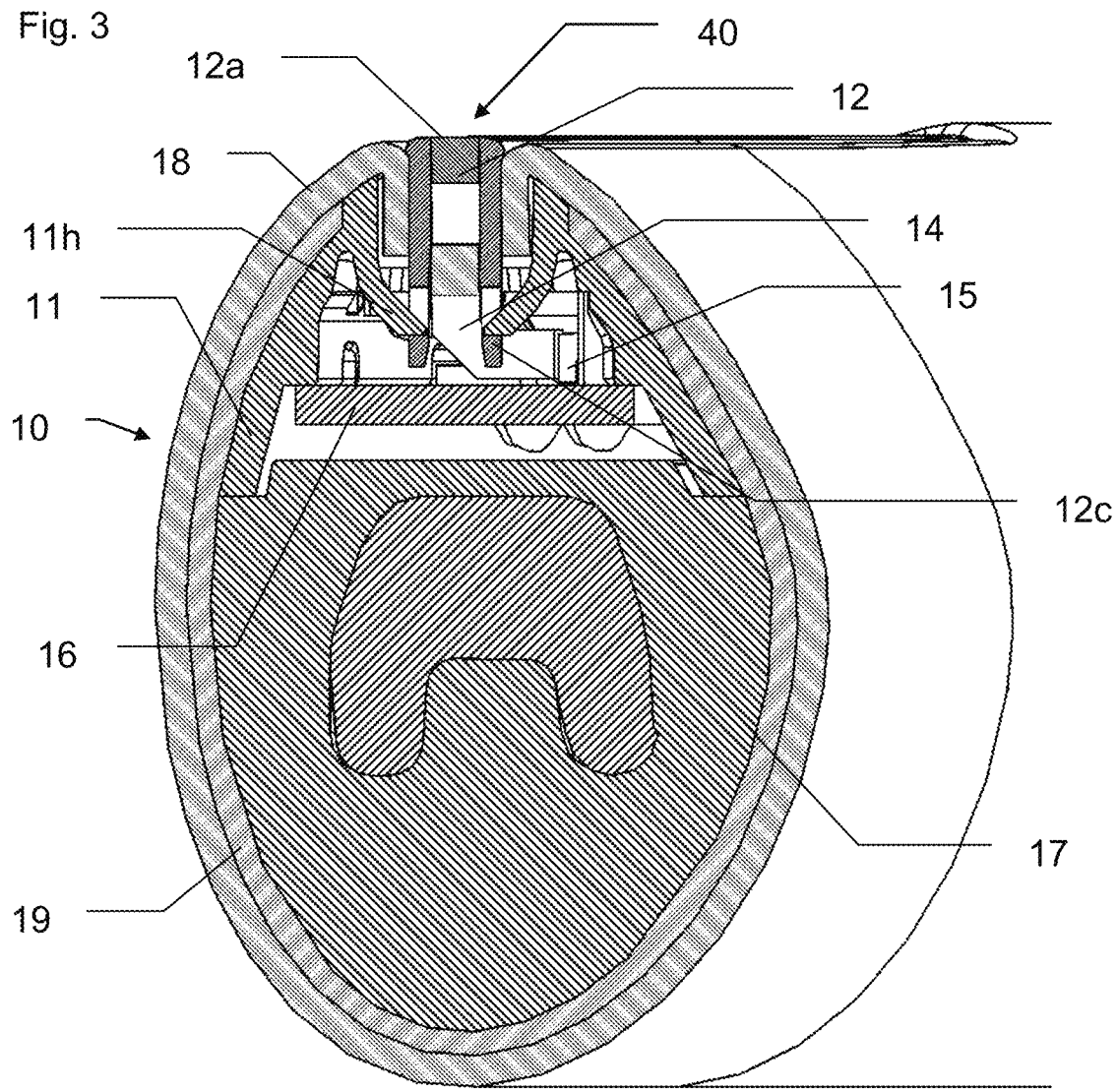

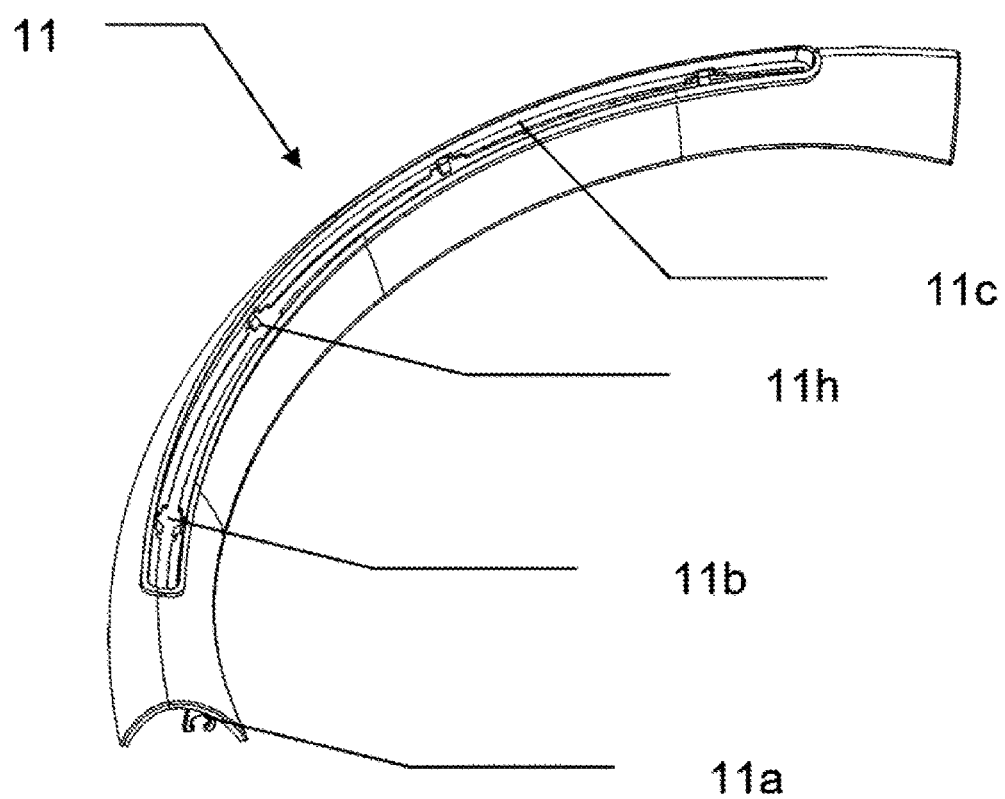
[Fig. 4]

[Fig. 5]
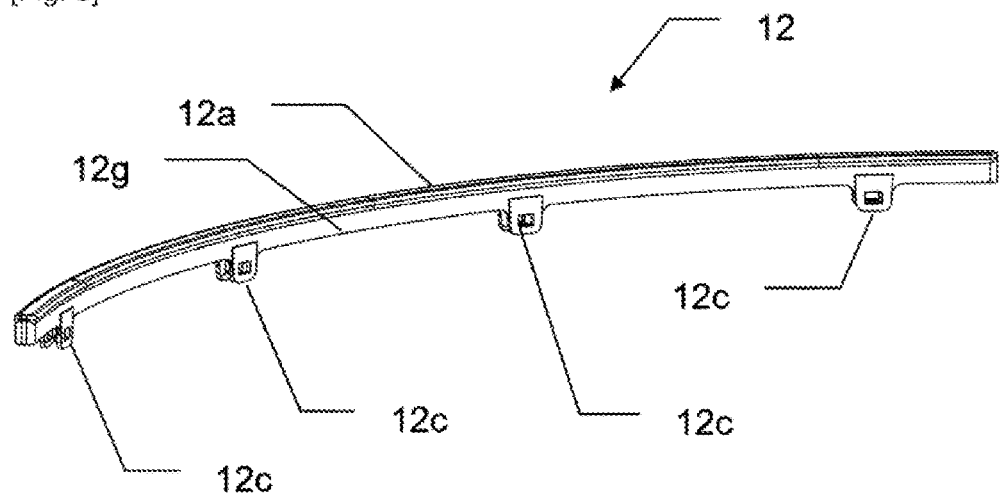
[Fig. 6]
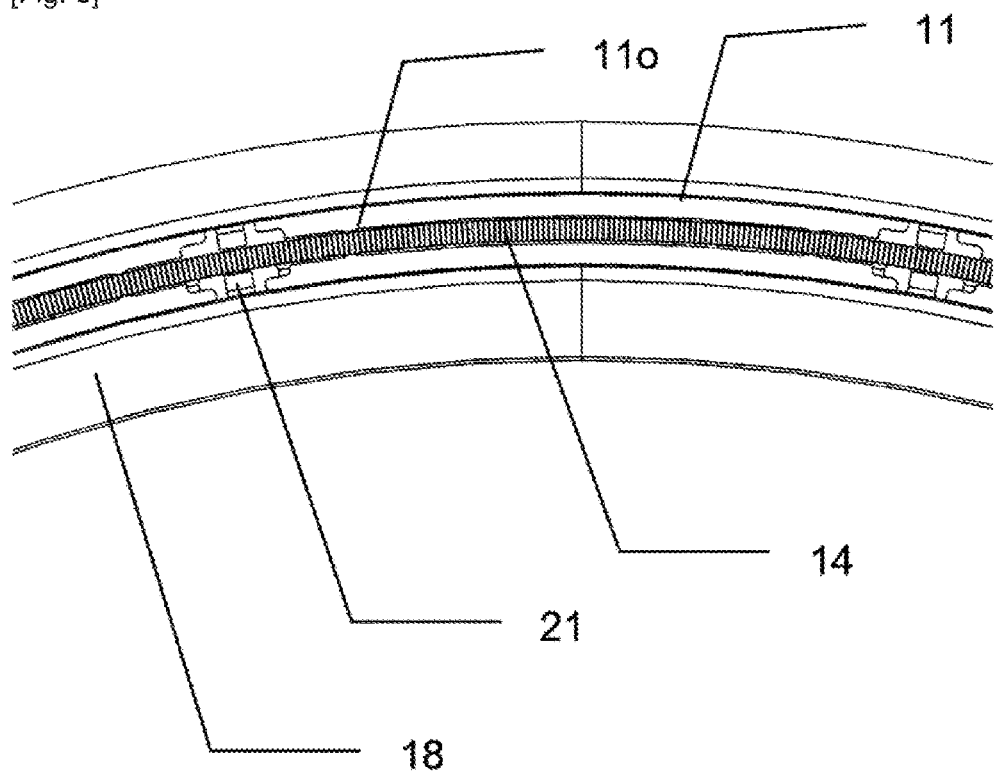

VEHICLE STEERING WHEEL LIGHTING DEVICE HAVING A LIGHT GUIDE SUPPORTING THE DIFFUSER

TECHNICAL FIELD OF THE INVENTION

The present invention generally relates to a lighting device mounted in a steering wheel rim of a motor vehicle.

STATE OF THE ART

Lighting devices installed in a steering wheel rim are known in the prior art. Document WO2019/048538 discloses a method for manufacturing a car steering wheel. Nevertheless, the document is silent on the deformations of a light diffuser at the time of assembly or use. These deformations can damage the other parts of the steering wheel or cause poor uniformity of the light.

DISCLOSURE OF THE INVENTION

One aim of the present invention is to address the disadvantages of the prior art mentioned above and in particular, first of all, to propose a lighting device for a steering wheel rim, which limits or eliminates the risks of causing defects in appearance of the diffusion of light, while limiting damage to the other parts of the steering wheel.

A first aspect of the invention therefore relates to a lighting device for a vehicle steering wheel rim, comprising:
- a holding body comprising at least one internal wall with at least one opening,
- at least one light source arranged to emit light,
- a diffuser arranged to diffuse the light coming from the at least one light source towards the vehicle occupant,
- a light guide arranged to guide the light emitted from the at least one light source towards the diffuser, characterized in that the light guide comprises a light collecting face arranged on a first side of the opening, a light emitting face arranged on a second side of the opening, and the light guide is also engaged with the diffuser to shape it with a predetermined size.

Thus, since the diffuser is arranged to be assembled on a steering wheel rim, it preferably has a thin shape and an arc of circle, which makes it flexible. This flexibility can lead to deformations of the diffuser, in particular during its assembly, which can bump against other parts of the rim or of the lighting device and damage them, but also be deformed and no longer keep its optimal shape, for example in an arc of circle (for example, the diffuser may twist or overturn) and thus the scattering of scattered light may have appearance defects.

In other words, the light guide provides a support for the diffuser, such as a support or contact that can shape the diffuser in its optimal form.

This makes it possible to propose a lighting device for a vehicle steering wheel rim which ensures good positioning and good resistance of the diffuser, which limits the deformations of the diffuser while avoiding damage to the other parts, which ensures good uniformity of the light scattered by the diffuser, without hot spot (bright light) or cold spot (low light) due to the geometry of the diffuser, in particular when the diffuser is installed after the leather sheathing on the steering wheel rim.

This also makes it possible to better support the diffuser, and to ensure its centering, so that there is no parasitic movement or loss of light. This is particularly important for diffusers having a large arc of circle.

The light guide may also interpenetrate the diffuser.

Advantageously, the diffuser may not touch the internal wall of the holding body, in particular on one side of the internal wall oriented towards the user of the steering wheel.

Thus, a first aim is to make the lighting device compact for a rim whose bulk is reduced, and another purpose is to propose a device that allows precise positioning and correct guidance of light, and good performance of the components relative to the others. This makes it possible to reduce eccentricities and reduce poor scattering of light. That is, the device is made consistent in terms of dimensions, even after assembly, and there is no positional drift.

A first aspect of the invention therefore relates to a lighting device for a vehicle steering wheel rim, comprising:
- a holding body comprising at least one opening arranged between an inner part of the housing and an outer part of the housing,
- at least one light source arranged in the inner part,
- a diffuser arranged to diffuse light from the at least one light source towards a vehicle occupant,
- a light guide arranged on both sides of the at least one opening and at least partially in contact with the diffuser so as to support it.

Thus, the housing can have an internal wall with an opening to allow the light guide to pass through, which is placed on each side of the opening, while passing through it.

Advantageously, the light guide may comprise a transmission portion arranged between the collecting face and the emitting face and arranged in the at least one opening.

Advantageously, the internal wall may be arranged between the light source and the diffuser.

Advantageously, the light guide and the diffuser may each comprise a coupling portion arranged to fit one inside the other.

This makes it possible to ensure the correct positioning of the diffuser, both in assembly and during the working life thereof, while ensuring the compact nature of the lighting device in the steering wheel rim which is a confined space. This makes it possible not to need to add intermediate parts for positioning, which reduces the complexity of the device.

Advantageously, the light guide may have a width less than a width of the at least one opening of the internal wall.

This ensures correct positioning of the diffuser with the light guide, without redundancy.

Advantageously, the light guide may be at least partially in contact with the diffuser on the side of the second side of the opening.

This makes it possible to ensure the support of the diffuser as close as possible to the outside of the steering wheel and to the viewing of the user.

Advantageously, the light guide may have at least one dimension larger than a dimension of the opening on the side of an inner part of the holding body so as to require an assembly of the light guide on the holding body before the positioning of the lighting device on the steering wheel rim. The larger dimension is preferably considered in a cross section to the rim, that is, passing through an axis of rotation of the steering wheel, for example a steering column axis.

This ensures good positioning of the diffusion, in particular in cases where the light guide is assembled in the lighting device (or light bar) before it is mounted on the steering wheel and therefore well before the diffuser which is mounted on it after the leather sheathing. This makes it possible to more easily control the positioning of the light guide relative to the light sources, such as LEDs.

Advantageously, the diffuser comprises clips, so as to be clipped onto the holding body.

Advantageously, the clips are arranged to be in an inner part of the holding body when the diffuser is assembled with the holding body.

This makes it possible to attach the diffuser to the holding body, while ensuring its correct positioning, in particular in optical terms, with the engagement of the diffuser and the light guide.

Advantageously, flanks of the light guide or of the diffuser comprise ribs or guide portions.

This ensures better guidance of the light guide in assembly and use.

Advantageously, the light guide is held transversely by the opening.

This ensures that the light guide is held.

Advantageously, the holding body comprises a single opening, arranged to allow the passage of light from all of a plurality of light sources to the diffuser.

Advantageously, the holding body is arranged to be covered with a steering wheel sheath.

This ensures the aesthetics of the steering wheel, which is a decorative part.

Advantageously, one end of the light guide engages (or is engaged with) one end of the diffuser arranged on the second side of the opening. Typically, the engagement is less than 4 mm, less than 3 mm, preferably less than 2 mm.

Advantageously, an engagement between the light guide and the diffuser is arranged on the second side of the opening.

Advantageously, the light guide forms a groove (or channel) wall with the holding body, a covering of the steering wheel (for example made of leather) being arranged less than 3 mm, less than 2 mm, or preferably less than 1 mm in the groove (on the side of the groove wall). Indeed, it is important to have a small overhang or insertion of the covering on the side of the light guide to facilitate the operation of folding the covering (for example made of leather) while limiting the risk of damage to the light guide. Alternatively, the light guide exceeds the covering less than 4 mm, less than 3 mm, preferably less than 2 mm from the second side of the internal wall.

A second aspect of the present invention relates to a vehicle steering wheel rim comprising a lighting device according to the first aspect.

This makes it possible to propose a steering wheel rim with a luminous appearance free of defects (when the lighting device is powered), and for which the diffuser does not damage the other parts during assembly as well as in use.

A third aspect of the present invention relates to a vehicle comprising a steering wheel with a rim according to the second aspect.

This makes it possible to propose a vehicle with a steering wheel having a defect-free luminous appearance (when the lighting device is powered), and for which the diffuser does not damage the other parts during assembly as well as in use.

A fourth aspect of the present invention relates to a method for mounting a lighting device on a steering wheel rim.

The method for mounting the lighting device on the steering wheel rim comprises the following steps:
providing a steering wheel rim,
mounting a light guide to a holding body,
mounting the holding body to the steering wheel rim.
The method may further comprise the step of:
mounting the diffuser to the steering wheel rim equipped with the holding body and the light guide.
The method may further comprise the step of:
installing a finishing sheath on the steering wheel rim, preferably carried out before the installation of the diffuser.

This makes it possible to propose an efficient and rapid assembly method, which ensures good resistance of the diffuser once mounted on the steering wheel rim.

DESCRIPTION OF THE FIGURES

Other features and advantages of the present invention will become more apparent upon reading the following detailed description of an embodiment of the invention, which is provided by way of example but in no manner limited thereto, and illustrated by the attached drawings, in which:

FIG. 3 shows another cross-sectional view of the rim comprising the lighting device, at a clip of a diffuser of the lighting device, along the cross-section II-II;

FIG. 4 shows a perspective view of a holding body of the lighting device;

FIG. 5 shows a perspective view of the diffuser.

FIG. 6 shows a top view of a light guide of the lighting device.

DETAILED DESCRIPTION OF EMBODIMENT(S)

Figure 1:
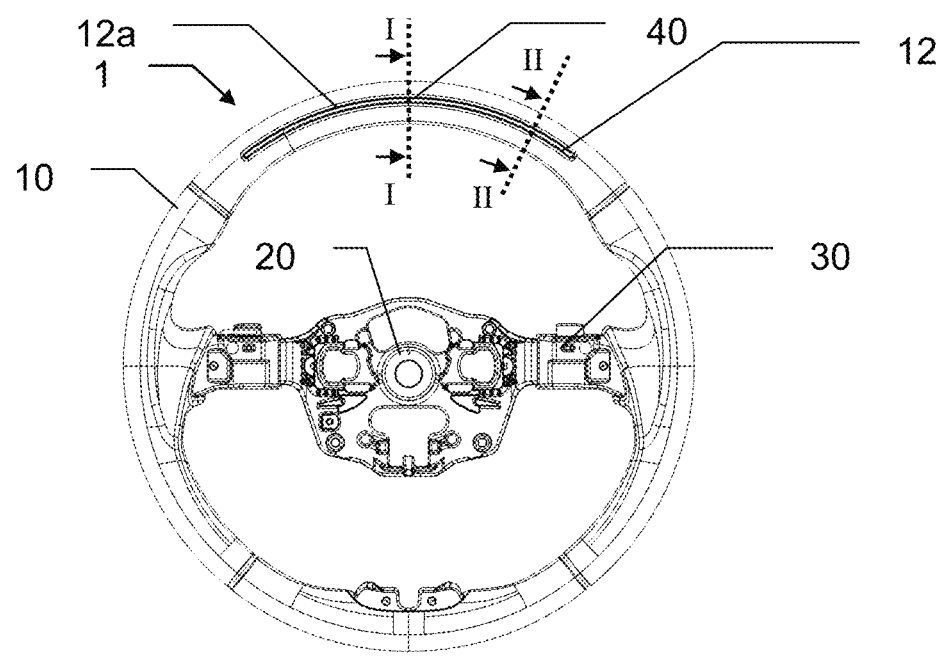
FIG. 1 shows a front view of a steering wheel comprising a lighting device in a rim.

FIG. 1 shows a front view of a steering wheel 1 comprising a lighting device 40 in a rim 10.

FIG. 1 thus shows the vehicle steering wheel 1 that typically comprises a rim 10 connected to a hub 20 by several arms 30. The rim 10 is equipped in the upper position, also known as the "12 o'clock" position, with a lighting device 40. This lighting device 40 has an external display wall 12a of a diffuser 12 that extends along the rim 10 over an angular sector of about 60° to 80°, but it is possible to provide a greater or lesser angular extent, up to 180° or even more for example, or even less than 60°.

Figure 2:
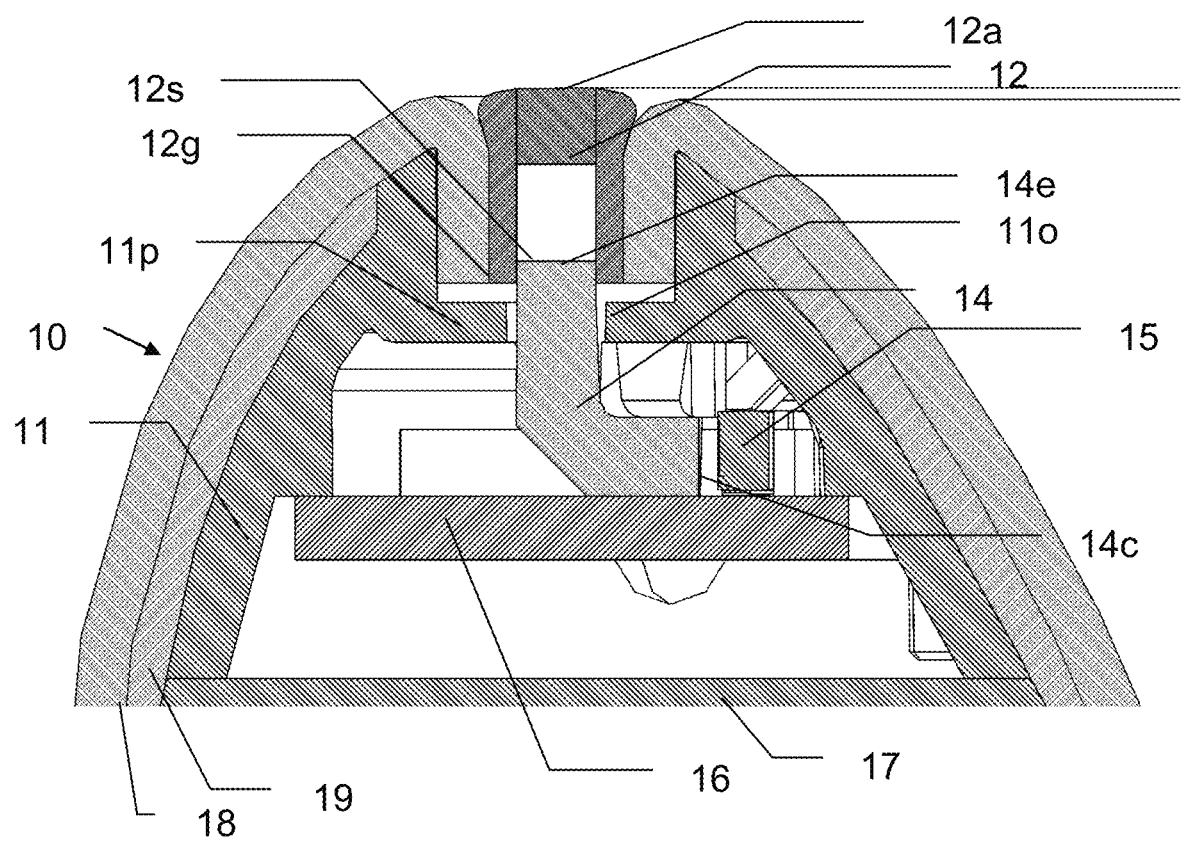
FIG. 2 shows a cross-sectional view of the rim comprising the lighting device, along the cross-section I-I.

A cross-section I-I of the rim 10 is provided in order to show a cross-sectional view of the rim along I-I in FIG. 2.

A cross-section II-II of the rim 10 is provided in order to show a cross-sectional view of the rim along II-II in FIG. 3.

FIG. 2 shows a cross-sectional view of the rim 10 comprising the lighting device 40, along the section I-I.

The lighting device 40 comprises a holding body 11 with an internal wall p and at least one opening 11o.

The lighting device 40 further comprises at least one light source 15 arranged to emit light, such as an LED. The lighting device 40 also comprises the diffuser 12 (or light diffuser 12) arranged to diffuse light coming from the light source 15 towards a vehicle occupant. In other words, the diffuser 12 diffuses the light towards the user, that is, its external surface or external display wall 12a is the surface directly visible by the user.

The lighting device 40 further comprises a light guide 14 arranged to guide the light emitted from the light source 15 towards the diffuser 12. The light guide 14 is arranged between the light source 15 and the diffuser 12.

The light guide 14 comprises a light collecting face 14c arranged on the side of the light source 15 and a light emitting face 14e on the side of the diffuser 12. The light guide 14 passes right through the opening 11o of the internal wall 11p of the holding body 11. That is, the collecting face 14c of the light guide 14 is arranged on a first side of the opening 11o and the emitting face 14e is arranged on a second side of the opening 11O (typically on the user's side).

In other words, the light guide 14 comprises a transmission portion arranged between the collecting face 14c and the emitting face 14e, and arranged in the opening 11O. The internal wall 11p is thus arranged between the light source 15 and the diffuser 12.

The light guide 14 is engaged with the diffuser 12 to shape it in a predetermined size. Indeed, the diffuser 12 is a thin part and in an arc of a circle in the embodiment presented, and it can therefore twist or overturn, both in assembly and during use, which can damage the other parts of the rim 10 or create defective points in the light scattering, which is not only unsightly but also ineffective for correctly transmitting information to the user.

The light guide 14 and the diffuser each comprise a coupling portion arranged to fit together. That is, the light guide 14 and the diffuser 12 can be in contact, or the light guide 14 can support the diffuser 12, but also the light guide 14 can engage with the diffuser 12 to lock its movement. Reference is made to the light guide 14 acting as a centering pin in the light guide 12 which comprises a receiving surface 12s and a lateral guide wall 12g.

The lighting device 40 further comprises a printed circuit board 16 (PCB) connected to the light source 15 to support it and control it.

The steering wheel rim 10 further comprises a covering 18 such as leather (or artificial leather or other) and a foam 17.

The rim 10 may further comprise an electronic device 19 sheathed and under the covering 18, such as a presence sensor (capacitive, resistive or other) and/or a heating element, the latter not being essential to the invention.

FIG. 3 shows another cross-sectional view of the rim 10 comprising the lighting device 40, at a clip of the diffuser 12 of the lighting device 40, that is, along the cross-section II-II.

Reference numbers are included as much as possible with respect to the other figures.

Thus, the covering 18 covers the electronic device 19 which is partially supported by the holding body 11. The printed electronic circuit 16 controls the light source 15 which illuminates the light guide 14.

The diffuser 12 is provided with clips 12c which are arranged to engage with protrusions 11h of the holding body 11, which makes it possible to attach the diffuser 12 to the holding body 11 by moving it through the top of the steering wheel, by pressing it into the holding body 11.

In one embodiment, the diffuser 12 is generally U-shaped, the lengths of the arms of the U of which vary along the rim 10. In one embodiment, at least two arms of the U of the diffuser 12 can open from the first side of the opening 11O as shown in FIG. 3. Furthermore, at least two arms of the U of the diffuser 12 may open on the second side of the opening 11o as shown in FIG. 2.

In one embodiment, the light guide 14 and the diffuser 12 can engage at several engagement points.

FIG. 4 shows a perspective view of the holding body 11 of the lighting device 40.

The holding body 11 is provided with attachment portions 11a on the bottom (or at its inner face), so as to guide one or more connecting cables of the PCB and thus facilitate the mounting of the lighting device on the steering wheel.

The holding body 11 is also equipped with holes 11b to leave a passage for the clips 12c of the diffuser 12 when the latter is inserted from the top into the holding body 11, in order to attach them together. The diffuser 12, which is provided with the clips 12c, can then engage with the protrusions 11h of the holding body 11.

The holding body 11 further comprises blanks 11c serving as a support for the covering 18 guiding the diffuser 12 during its installation in the holding body 11.

FIG. 5 shows a perspective view of the diffuser 12. As indicated above, the diffuser 12 comprises clips 12c, preferably installed all along the arc of the diffuser 12, for example eight clips (that is, four on the radially inner face of the diffuser 12 and four on the radially outer face of the diffuser 12).

The diffuser 12 comprises the lateral guide wall 12g to guide the diffuser during insertion into the holding body 11. The diffuser 12 further comprises a diffusion surface or external display wall 12a diffusing the light on the side opposite the light guide 12.

FIG. 6 shows a top view of the light guide 14. The covering 18 is shown and the diffuser 12 is not shown because it is not yet mounted on the rim 10. The holding body 11 may further comprise holding projections 21 in order to hold and/or center the light guide 14 in the opening 11O. This facilitates inter alia the subsequent assembly of the diffuser.

It will be understood that various modifications and/or improvements which are obvious for the person skilled in the art may be made to the different embodiments of the invention described in this present description without departing from the scope of the invention defined by the appended claims.

In particular, reference is made to adaptations in terms of number of fastening points such as clips 12c, enlarging or decreasing the arc of the diffuser 12.

The invention claimed is:

1. A lighting device for a vehicle steering wheel rim, comprising:
    a holding body comprising at least one internal wall with at least one opening,
    at least one light source arranged to emit light,
    a diffuser arranged to diffuse light coming from the at least one light source towards the vehicle occupant,
    a light guide arranged to guide the light emitted from the at least one light source towards the diffuser,
    wherein the light guide comprises a light collecting face arranged on a first side of the opening, a light emitting face arranged on a second side of the opening, and the light guide is further engaged with the diffuser to support the diffuser.

2. The lighting device according to claim 1, wherein the light guide comprises a transmission portion arranged between the collecting face and the emitting face, and arranged in the at least one opening.

3. The lighting device according to claim 1, wherein the internal wall is arranged between the light source and the diffuser.

4. The lighting device according to claim 1, wherein the light guide and the diffuser each comprise a coupling portion arranged to fit one inside the other.

5. The lighting device according to claim 1, wherein the light guide has a width less than a width of the at least one opening of the inner wall.

6. The lighting device according to claim 1, wherein the light guide is at least partially in contact with the diffuser on the second side of the opening.

7. The lighting device according to claim 1, wherein the light guide has at least one dimension larger than a dimension of the opening on the side of an inner part of the holding body so as to require a mounting of the light guide on the holding body before the positioning of the lighting device on the steering wheel rim.

8. The lighting device according to claim 1, wherein the diffuser comprises clips, so as to be clipped onto the holding body.

9. The lighting device according to claim 8, wherein the clips are arranged to be in an inner part of the holding body when the diffuser is assembled with the holding body.

10. The lighting device according to claim 1, wherein the light guide is held transversely by the opening.

11. The lighting device according to claim 1, wherein the holding body comprises a single opening.

12. The lighting device according to claim 1, wherein the holding body is arranged to be covered with a steering wheel sheath.

13. The lighting device according to claim 1 in combination with a vehicle steering wheel rim.

14. The lighting device according to claim 13 in combination with a vehicle.

* * * * *